United States Patent Office 3,022,261
Patented Feb. 20, 1962

3,022,261
VINYL RESIN PLASTICIZED WITH AN ADDUCT OF AN ALKYL VINYLPHOSPHONATE
Joseph E. Fields and John H. Johnson, Dayton, Ohio, assignors to Monsanto Chemical Company, St. Louis, Mo., a corporation of Delaware
No Drawing. Original application June 25, 1954, Ser. No. 439,486, now Patent No. 2,844,618, dated July 22, 1958. Divided and this application Jan. 2, 1958, Ser. No. 706,583
8 Claims. (Cl. 260—30.6)

The present invention relates to polyphosphonates, methods of producing the same and to resinous compositions comprising vinyl chloride polymers plasticized with the polyphosphonates.

According to the invention there are provided new and highly valuable liquid mixtures of polyphosphonates by the free-radical-catalyzed addition of a vinylphosphonate with a solvent for said phosphonate, which solvent is selected from the class consisting of alkyl and dialkylbenzenes having from 1 to 3 carbon atoms in the alkyl radical, normally liquid dialkyl phosphites having from 1 to 8 carbons atoms in the alkyl radical, and halogenated alkanes having from 1 to 2 carbons atoms and containing at least 3 halogen atoms attached to the same carbon atom. The reaction is one of simple addition in which one mole of said solvent adds to from 2 to 50 moles of the vinylphosphonate. The present polyphosphonates are thus adducts of the formula

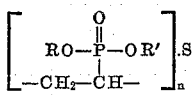

in which R and R' are alkyl radicals of from 1 to 8 carbon atoms, and $n$ is an integer of from 2 to 50 and S is the herein defined solvent.

Examples of the dialkyl vinylphosphonates are dimethyl, diethyl, diisopropyl, di-n-butyl, di-tert-butyl, di-n-amyl, di-n-hexyl, di-n-octyl, bis(2-ethylhexyl) vinylphosphonates or the mixed esters such as ethyl methyl or isobutyl n-propyl vinylphosphonate. A mixture of different dialkyl vinylphosphonates may be employed to give adducts having different recurring alkyl radicals.

As illustrative of the alkylbenzene or dialkylbenzene type solvents which add to from 2 to 50 moles of the vinylphosphonates according to the invention may be mentioned toluene, o-, m- and p-xylene, ethylbenzene, o-, m- and p-diethylbenzene, o-, m- and p-ethyltoluene, cumene, o-, m- and p-dipropylbenzene, p-cymene, o-, m- and p-ethylcumene, etc. Such alkylbenzenes possess at least one alkyl radical having a labile hydrogen atom and react readily with the vinylphosphonates to give the normally liquid polyphosphonates.

Examples of the halomethane type solvents which add to the vinylphosphonates to give the present normally liquid polyphosphonates are carbon tetrachloride, carbon tetrabromide, chloroform, bromoform, bromotrichloromethane, chlorotribromoethane, difluorodichloromethane, iodoform, hexachloroethane, asym-tetrabromoethane, dibromotetrachloroethane, etc.

Examples of the dialkyl phosphite type of solvents are the dimethyl, diethyl, di-n-propyl, di-n-butyl, diisobutyl, di-n-amyl, ethyl methyl or n-butyl isopropyl phosphites.

Free-radical-liberating agents which may be employed in promoting addition of the present vinylphosphonate to the solvent are compounds which will decompose to give free radicals. Such compounds include peroxygen type catalysts, for example, acyl peroxides such as acetyl, benzoyl, or lauroyl peroxide; hydrocarbon peroxides or hydroperoxides such as di-tert-butyl peroxide, di-tert-amyl peroxide, tert-butyl hydroperoxide, cumene hydroperoxide or 2-cymene hydroperoxide; and inorganic per compounds such as hydrogen peroxide, sodium peroxide, sodium perborate, potassium persulfate, and alkali percarbonate; hydrazine derivatives such as hydrazine hydrochloride and dibenzoyl hydrazine; organo-metallic compounds such as tetraethyl lead, etc. For convenience, the peroxygen type catalysts will be hereinafter referred to as peroxidic compounds. Only catalytic quantities of the free-radical-liberating agent need be employed in promoting the addition reaction. Ultra-violet light may be employed with the catalyst or as the sole catalytic agent.

Formation of the present adducts probably proceeds through a chain mechanism, with termination of the polyvinylphosphonate chain at an early stage, i.e., at a point at which no more than 50 moles of the vinylphosphonate have added to one mole of the solvent. Depending upon the nature and the quantity of the reactants and of the free-radical-liberating agent, as well as upon the reaction conditions, chain propagation may be terminated at various stages to yield products in which from 2 to 50 moles of the vinylphosphonate have added to one mole of the solvent. At any stage, however, mixtures of a series of the polyphosphonate adducts are obtained. Each adduct contains only one mole of the solvent, but the number of moles of vinylphosphonate present in each adduct may be from 2 to 50 and the proportion of the various adducts in the reaction mixture may be such as to give an average of, say, up to 5 moles or up to 20 moles, or even up to 45 moles of the vinylphosphonate per mole of the solvent. The individual adducts present in the mixture may be separated from each other only with difficulty; for most purposes the liquid mixtures of adducts are employed directly as they have been formed; or there are employed mixtures having a narrow range of molecular weights, which mixtures are easily obtainable by fractional distillation of the reaction product or by termination of the reaction at predetermined stages.

In preparing the present polyphosphonate adducts we generally operate as follows: The vinylphosphonate is mixed with the solvent and the free-radical-liberating catalyst and the resulting mixture is maintained, advantageously with agitation, at a temperature which permits a steady decomposition of the catalyst and consequent steady liberation of free radicals from the solvent. Or, if desired, the ester may be added gradually, e.g., dropwise, to the solvent while constantly maintaining an optimum quantity of active catalyst in the reaction zone, which zone is preferably kept at a temperature which is conducive to the formation of free radicals. Depending upon the nature of the individual reactants and catalyst and the properties desired in the final product, increased temperatures, e.g., temperatures of, say, from 60° C. to about 125° C. may be generally employed. The reaction time may vary from, say, several hours to several days. Substantially equimolar quantities of the solvent and the vinylphosphonate may be used; however, for the production, in good yields, of adducts in which from 2 to 50 moles of the phosphonate have combined with one mole of solvent, an excess of the solvent is preferred. An excess of the vinylphosphonate is not recommended. Variation of catalyst quantity has been found to have some effect on the nature of the adduct. While catalyst quantities of up to 10% based on the weight of the vinylphosphonate may be used, I have found that generally a catalyst range of from 1.0 to 6.0 percent is preferable. The use of lower quantities of catalyst tends to favor formation of the higher molecular-weight adducts.

The progress of the addition reaction may be readily gauged by noting change in viscosity of the reaction mixture. When a liquid product of the desired viscosity has been attained, or when there is cessation in viscosity-change, the reaction mixture may be distilled to remove unreacted solvent and/or vinylphosphonate and catalyst. The residue will comprise a mixture of the polyphosphonate adducts.

In preparing the present adducts there may be employed, in addition to the present chain-terminating solvents, an inert diluent or unreactive solvent. For example, benzene or hexane may be used together with the alkylbenzene, alkyl phosphite or haloalkane, either to serve as catalyst solvent, to mitigate reaction heat, or to dilute the concentration of the vinylphosphonate in the reaction mixture. The use of such a solvent or diluent, however, is of little economic advantage.

The present polyphosphonate adducts are clear, easily flowing liquids which are characterized by very good stability to heat and light. They may be advantageously used for a variety of industrial and agricultural purposes, for example, as dielectric or other functional fluids, as lubricant additives, and as biological toxicants. The present adducts generally confer plasticity to resinous polymeric materials. They are particularly valuable as plasticizers for vinyl chloride polymers, and for the polyvinyl acetals, e.g., the polyvinyl butyral known to the trade as "Butvar," with which polymers they may be employed with advantage either as sole or as secondary plasticizers.

The present adducts impart flexibility to vinyl chloride polymers at low temperatures; they are compatible with said polymers, and show no exudation of plasticizer even at plasticizer content of up to 60%. Although the quantity of plasticizer will depend upon the particular polymer to be plasticized and upon its molecular weight, it is generally found that compositions having from 10% to 60% by weight of plasticizer will, in most cases, be satisfactory for general utility. The good flexibility of the present plasticized composition increases with increasing plasticizer concentration.

It is advantageous with some of the present vinylphosphonate adducts to employ increased temperatures in blending them with the vinyl chloride polymers. Temperatures of from, say, 200° F. to 350° F. may be advantageously employed in effecting a homogeneous blend of the vinyl chloride polymer and the adducts. The present adducts are particularly valuable when employed in conjunction with known polyvinyl chloride plasticizers, for example, especially those of the alkyl aryl phosphate class.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i.e., plasticized polyvinyl chloride compositions that are flexible at room temperature often become very brittle and useless at low temperatures. Low temperature flexibility tests herein employed are according to the Clash-Berg method. This test is a measure of the stiffness of a plastic specimen as a function of temperature, measured by a means of a torsional test. The test is essentially as described by Clash and Berg, Industrial and Engineering Chemistry, 34 1218 (1942).

*Mechanical properties.*—Tensile strength and percent elongation were determined by the standard test of the American Society for Testing Materials D-638-52T and D-412-41.

The invention is further illustrated, but not limited, by the following examples:

Example 1

A mixture consisting of 35 g. of di-n-butyl vinylphosphonate, 1.75 g. (5% by weight) of benzoyl peroxide and 138 g. of carbon tetrachloride was charged to a stoppered bottle, and then maintained, with agitation, in a circulating air oven at 95° C. for 19 hours. The resulting reaction mixture was distilled to remove material boiling up to 175° C./1–2 mm. Hg pressure, and there was thus obtained as residue 43 g. of the light yellow liquid adduct of carbon tetrachloride and di-n-butyl vinylphosphonate, $n_D^{25}$ 1.4738. It was readily soluble in benzene and was soluble in lubricating oil up to at least 3%. Chlorine analysis of the adduct gave a value of 16.62%, which indicates combination of one mole of the carbon tetrachloride with an average of 3.18 moles of the di-n-butyl vinylphosphonate.

Example 2

There was milled to a homogeneous blend a mixture consisting of 30 parts by weight of the adduct of Example 1, 70 parts by weight of polyvinylchloride and 2 parts by weight of a stabilizer known to the trade as "Thermolite 31" said stabilizer is an organo tin derivative of a mercapto carboxy compound prepared as described in the Weinberg et al. U.S. Patent No. 2,648,650. Molded test specimens prepared therefrom compare as follows with respect to tensile strength and elongation to a similarly prepared specimen from 28 parts by weight of dioctyl phthalate and 72 parts by weight of the polyvinyl chloride or to the unplasticized polyvinyl chloride:

|  | None | Plasticizer | |
|---|---|---|---|
|  |  | Adduct of Ex. 1 | Dioctyl phthalate |
| Tensile strength at failure, p.s.i. | 6,841 | 5,200 | 2,827 |
| Elongation at failure, percent | 50 | 205 | 228 |

In another test, films were cast from a cyclohexanone solution of a mixture consisting of 30 parts by weight of the di-n-butyl ethylene phosphonate-carbon tetrachloride adduct and 70 parts by weight of polyvinyl chloride. The films were dried at 95–100° C., cooled and then stripped. Microscopic examination of the clear and flexible film thus obtained revealed no incompatibility of the telomer with the polyvinyl chloride.

Example 3

A mixture consisting of 245 g. of di-n-butyl vinylphosphonate, 12.25 g. of benzoyl peroxide and 966 g. of carbon tetrachloride was charged to seven bottles, the bottles were capped and then maintained on a rocking rack in an oven at 95° C. for 72 hours. Subsequent distillation of the combined reaction mixtures to remove material boiling up to 170° C./1–2 mm. Hg pressure gave as residue 284 g. of a clear liquid residue, $n_D^{25}$ 1.4762, and having a specific gravity of 1.169. Analysis of this residue gave 16.16% chlorine, thus indicating it to be an adduct in which one mole of the carbon tetrachloride is combined with an average of 3.29 moles of the di-n-butyl vinylphosphonate.

Example 4

This example shows evaluation of the adduct of Example 3 as a secondary plasticizer with a commercial, alkyl aryl phosphate type plasticizer known to the trade as "Santicizer 141." The following formulations were tested:

|  | Parts by weight | Percent by volume |
|---|---|---|
| I. Polyvinyl chloride | 100.0 | 55.6 |
| Adduct of Ex. 3 | 33.3 | 22.2 |
| Santicizer 141 | 31.0 | 22.2 |
| Thermolite 31 | 2.0 |  |
| II. Polyvinyl chloride | 100.0 | 55.7 |
| Santicizer 141 | 61.2 | 44.3 |
| Thermolite 31 | 2.0 |  |

The above mixtures were respectively blended on the mill at roll temperatures of 340° F., and molded test specimens were prepared from the milled sheets at a molding pressure of 100 p.s.i. Testing of the specimens by the procedures described above gave the following values:

| Formulation | Clash-Berg | | Tensile strength at break [1] | Percent elongation at break |
| --- | --- | --- | --- | --- |
| | $T_t$ | $T_{2000}$ | | |
| I | −25.0 | 22.8 | 3,990 | 328 |
| II | −27.5 | 12.0 | 2,410 | 354 |

[1] Using a cross-head speed of 20″/min.

Example 5

A mixture consisting of 35 g. (0.159 mole) of di-n-butyl vinylphosphonate, 105 g. (0.477 mole) of di-n-butyl hydrogen phosphite and 1.75 g. of benzoyl peroxide was maintained, with agitation, at a temperature of 95° C. for 72 hours. Removal of unreacted material and stripping of the pot residue to a temperature of 200° C./1-2 mm. gave as residue 47 g. of the viscous, liquid adduct of di-n-butyl vinylphosphonate and di-n-butyl hydrogen phosphite, analyzing 13.17% phosphorus.

Example 6

The di-n-butyl vinylphosphonate-di-n-butyl hydrogen phosphite adduct of Example 5 was tested as a plasticizer for polyvinyl chloride using the following formulations:

| | Parts by weight | Percent by volume |
| --- | --- | --- |
| I. Polyvinyl chloride | 35.7 | 60 |
| Adduct of Example 5 | 20.0 | 40 |
| Stabilizer RS-31 | 1.0 | |
| II. Polyvinyl chloride | 53.5 | 60 |
| Adduct of Example 5 | 15.0 | 20 |
| Santicizer 141 | 14.0 | 20 |
| Stabilizer RS-31 | 1.0 | |

The stabilizer used above is reputed to be an organic compound of tin. The Santicizer 141 is a commercial plasticizer of the alkyl aryl phosphate type.

Formulations I and II were respectively milled on rolls at full steam (340° F.). Two different molding procedures were used, i.e., molding was effected in one case at a pressure of 200 p.s.i. and in the other at a pressure of 1,000 p.s.i. The following Clash-Berg and tensile values were obtained:

| Formulation | $T_t$ | $T_{2000}$ | Tensile strength at break [1] | Percent elongation at break |
| --- | --- | --- | --- | --- |
| I. Molding at— | | | | |
| 200 p.s.i. | −13.2 | 53.1 | 2,616 | 238 |
| 1,000 p.s.i. | −13.7 | 49.6 | 2,675 | 265 |
| II. Molding at— | | | | |
| 200 p.s.i. | −20.5 | 31.2 | 2,588 | 282 |
| 1,000 p.s.i. | −21.0 | 25.1 | 2,769 | 268 |

[1] Using a cross-head speed of 20″/min.

Example 7

A mixture consisting of 35 g. of diethyl vinylphosphonate, 138.3 g. of carbon tetrachloride and 1.75 g. of benzoyl peroxide was maintained, with agitation, at a temperature of 95° C. for 70 hours. The resulting reaction mixture was distilled to remove carbon tetrachloride and the viscous residue thus obtained was held at 160–170° C./2-3 mm. for 1 hour. There was thus obtained as residue 37 g. of the amber syrupy diethyl vinylphosphonate-carbon tetrachloride adduct which was soluble in water with accompanying hydrolysis.

Example 8

This example shows preparation of an adduct of di-n-butyl vinylphosphonate and p-cymene. A mixture consisting of 25 g. of the phosphonate, 100 g. of the cymene and 0.633 ml. of di-tert-butyl peroxide was maintained, with agitation, in a circulating air oven at a temperature of 120° C. for 72 hours. Distillation of the resulting reaction mixture to remove material boiling below 185° C./1 mm. gave as residue 21.4 g. (81.5% yield) of the viscous di-n-butyl vinylphosphonate-p-cymene adduct analyzing 58.37% carbon as against 54.9%, the carbon value for monomeric di-n-butyl vinylphosphonate. A molded test specimen prepared from 100 parts by weight of polyvinyl chloride and 42.9 parts by weight of the present adduct was clear and transparent. Employing a cross-head speed of 2″/min. it was found to have a tensile strength at break of 4130 p.s.i. and an elongation at break of 235%.

Example 9

This example is like Example 8 except that instead of using p-cymene, diisopropylbenzene was employed. The viscous residue obtained upon removing material B.P. below 185° C./1 mm. analyzed 57.98% carbon, indicating the presence of an adduct of the diisopropylbenzene and a low molecular weight polymeric di-n-butyl vinylphosphonate. A molded test specimen prepared from 100 parts by weight of polyvinyl chloride and 42.9 parts by weight of the present adduct was clear and transparent. Using a cross-head speed of 2″/min, it was found to have a tensile strength at break of 2130 p.s.i. and a percent elongation at break of 235.

Example 10

The carbon tetrachloride-di-n-butyl vinylphosphonate adduct of Example 3 was further tested as a plasticizer for a polyvinyl butyral resin known to the trade as "Butvar." A mixture consisting of 44 parts by weight of the adduct and 66 parts by weight of the "Butvar" was dissolved in a solvent consisting of 95 parts by weight of the tetrahydrofuran. Films cast from the resulting solution were dried, cooled and stripped. Microscopic examination of the flexible transparent and colorless film thus obtained showed complete compatibility of the adduct.

This application is a division of my copending application Serial No. 439,486, filed June 25, 1954, and now Patent No. 2,844,618, issued July 22, 1958.

What we claim is:

1. A resinous composition comprising a polymer selected from the class consisting of polyvinyl chloride and a polyvinyl acetal plasticized with an adduct in which there are chemically combined from 2 to 50 moles of an alkyl vinylphosphonate in which the alkyl radical has from 1 to 8 carbon atoms with 1 mole of a compound which is a solvent for said phosphonate and which is selected from the class consisting of alkyl and dialkyl benzenes having from 1 to 3 carbon atoms in the alkyl radical, normally liquid alkyl phosphites having from 1 to 8 carbon atoms in the alkyl radical and halogenated alkanes having from 1 to 2 carbon atoms and containing at least 3 halogen atoms attached to the same carbon atom.

2. A resinous composition comprising polyvinyl chloride plasticized with an adduct in which there are chemically combined 1 mole of a dialkyl phosphite having from 1 to 8 carbon atoms in the alkyl radical with from 2 to 50 moles of an alkyl vinylphosphonate having from 1 to 8 carbon atoms in the alkyl radical.

3. A resinous composition comprising polyvinyl chloride plasticized with an adduct in which there are chemically combined 1 mole of halogenated alkane having from 1 to 2 carbon atoms and containing at least 3 halogen atoms with from 2 to 50 moles of an alkyl vinylphosphonate having from 1 to 8 carbon atoms in the alkyl radical.

4. A resinous composition comprising polyvinyl chloride plasticized with an adduct in which there are chemically combined 1 mole of carbon tetrachloride with from 2 to 50 moles of di-n-butyl vinylphosphonate.

5. A resinous composition comprising polyvinyl chloride plasticized with an adduct in which there are chemically combined 1 mole of di-n-butyl hydrogen phosphite with from 2 to 50 moles of di-n-butyl vinylphosphonate.

6. A resinous composition comprising polyvinyl chloride plasticized with an adduct in which there are chemically combined from 2 to 50 moles of an alkyl vinylphosphonate in which the alkyl radical has from 1 to 8 carbon atoms with 1 mole of a compound which is a solvent for said phosphonate and which is selected from the class consisting of alkyl and dialkyl benzenes having from 1 to 3 carbon atoms in the alkyl radical, normally liquid alkyl phosphites having from 1 to 8 carbon atoms in the alkyl radical and halogenated alkanes having from 1 to 2 carbon atoms and containing at least 3 halogen atoms attached to the same carbon atom.

7. A resinous composition comprising a polyvinyl acetal plasticized with an adduct in which there are chemically combined from 2 to 50 moles of an alkyl vinylphosphonate in which the alkyl radical has from 1 to 8 carbon atoms with 1 mole of a compound which is a solvent for said phosphonate and which is selected from the class consisting of alkyl and dialkyl benzenes having from 1 to 3 carbon atoms in the alkyl radical, normally liquid alkyl phosphites having from 1 to 8 carbon atoms in the alkyl radical and halogenated alkanes having from 1 to 2 carbon atoms and containing at least 3 halogen atoms attached to the same carbon atom.

8. A resinous composition comprising polyvinyl butyral plasticized with an adduct in which there are chemically combined one mole of carbon tetrachloride with from 2 to 50 moles of di-n-butyl vinylphosphonate.

No references cited.